2,992,967
INSECTICIDAL COMPOSITIONS COMPRISING CONDENSATES OF HEXACHLOROCYCLO-PENTADIENE WITH 1,2-DICHLOROBU-TENE-3

Albert H. Haubein, Christiana, Del., assignor to Hercules Powder Company, Wilmington, Del., a corporation of Delaware
No Drawing. Filed Dec. 2, 1954, Ser. No. 472,770
4 Claims. (Cl. 167—30)

This invention relates to new and useful compositions of matter and to insecticidal compositions containing the same.

While condensates of hexachlorocyclopentadiene and various unsaturated compounds have shown insecticidal properties, further chlorination of such products has been necessary for commercial success.

Now in accordance with the present invention it has been found that the Diels-Alder adduct of hexachlorocyclopentadiene and 1,2-dichlorobutene-3 is a condensate which has an optimum insecticidal activity not requiring further chlorination.

The compounds of this invention are produced by heating hexachlorocyclopentadiene with 1,2-dichlorobutene-3 at a temperature in the range of about 80° C. to about 220° C.

The method of preparing these products and their use as insecticides is illustrated by the following example in which all parts are by weight.

Example

A mixture of 37 parts 1,2-dichlorobutene-3 and 83 parts hexachlorocyclopentadiene in 50 ml. of xylene was refluxed for 48 hours and the product was then distilled, first at 18 mm. pressure to remove unreacted dichlorobutene and then at 0.2 mm. pressure, to remove unreacted hexachlorocyclopentadiene and recover 72 parts of reaction product boiling at 110–125° C. (0.2 mm. pressure). The reaction product analyzed 70.8% chlorine corresponding to a compound of the formula $C_9H_6Cl_8$ (71.3% chlorine).

This compound of the formula $C_9H_6Cl_8$ produced from 1,2-dichlorobutene-3 was dissolved in deodorized kerosene at concentrations of 0.05%, 0.025% and 0.01% and tested as an insecticide. The knockdown of common houseflies in 2 hours was 80%, 60% and 0%, respectively, at these concentrations while the kill in 24 hours was 100%, 98% and 40%, respectively, at these concentrations.

The product of reaction of 1,2-dichlorobutene-3 with hexachlorocyclopentadiene is 2($\alpha,\beta$-dichloroethyl)-1,4,5,6,7,7-hexachlorobicyclo-[2.2.1]-5-heptene and is an adduct produced by the well-known Diels-Alder reaction.

The reaction temperature for producing the compound of this invention is about 80–250° C. The preferred reaction temperature is about 120° to about 180° C.

The oily product of this invention has maximum insecticidal activity for its particular chemical composition and further chlorination greatly reduces its activity.

The insecticidal compositions of this invention are produced by admixing the adduct of this invention with a suitable adjuvant which is an inert material to facilitate the mechanical distribution of the toxicant. Inert materials to facilitate the mechanical distribution of the toxicant are added for the purposes outlined in Frear (Chemistry of Insecticides, Fungicides, and Herbicides by Donald E. H. Frear, second edition, 1948, page 5) to form sprays, dusts, and aerosols from the adducts. Surface-active dispersing agents are used in admixture with the adducts to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of 10.0% to about 0.0001% of the aqueous dispersion.

Suitable surface-active dispersing agents for use in the compositions of this invention are those disclosed in Chemistry of Insecticides, Fungicides, and Herbicides (l.c. pages 280–287) for use with known insecticides and include soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, and bentonite and related hydrated aluminum silicates having the property of forming a colloidal gel. Among the other surface-active dispersing agents which are useful in the compositions of this invention are the omega-substituted polyethylene glycols of relative long-chain length, particularly those in which the omega substituent is aryl, alkyl, or acyl. Compositions of the adduct toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus the toxic material may contain a clay as the sole adjuvant, or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agents may contain in addition synergists and/or adhesive or sticking agents. Thus the adduct mixtures admixed with these inert materials which facilitate the mechanical distribution of the adduct in accordance with this invention are those containing the above-listed surface-active dispersing agents and hydrocarbon solvent dispersing agents.

The amount of adduct in the composition with the inert material which facilitates the mechanical distribution of the toxicant will depend upon the type of inert material and the use to which it is to be put. The compositions will generally contain less than about 30% adduct. Agricultural dusts may contain 40–60% adduct as concentrates and will generally contain 10–30% adduct in the form as used. Household sprays will contain from 0.1 to 10% adduct, preferably about 2.5% in deodorized kerosene, but concentrates may contain 25–90% adduct. Agricultural sprays will, likewise, contain 0.1 to 10% of the adduct. Aqueous emulsions will contain sufficient surface-active dispersing agent to maintain an emulsion of the adduct during the spraying process. Concentrates from which emulsions are made may contain 25–90% adduct along with the surface-active dispersing agent.

For many purposes, it may be desirable to use the adduct in combination with minor amounts of other insecticidal toxicants. Many toxicants have a very high knockdown in relatively dilute solutions, but higher concentrations must be used in order to obtain the desired degree of kill. Due to the very high degree of killing power which the adducts of this invention possess, these compounds may be added to such toxicants, thereby enabling the use of much more dilute solutions than would otherwise be possible. Toxicants with which these adducts as the essential component may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches, moths, carpet beetles, bedbugs, boll weevils, boll worms, army worms, grasshoppers, and many other pests.

What I claim and desire to protect by Letters Patent is:

1. As a new composition of matter 2($\alpha$,$\beta$-dichloroethyl)-1,4,5,6,7,7-hexachlorobicyclo-[2.2.1]-5-heptene represented by the planar structural formula 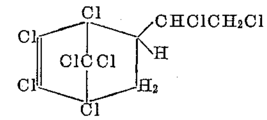 2. An insecticide comprising the compound of claim 1 and an insecticidal adjuvant as a carrier therefor.

3. The method of producing an insecticidally active composition of matter which comprises heating hexachlorocyclopentadiene with 1,2-dichlorobutene-3 at 80° to 220° C. until an insecticidally active condensate is produced therefrom.

4. The method of combatting insects which comprises applying to insects and their habitats a composition comprising 5-(1,2-dichloroethyl)-1,2,3,4,7,7-hexachlorobicyclo [2.2.1]-2-heptene, said compound being the Diels-Alder adduct of hexachlorocyclopentadiene and 1,2-dichloro-3-butene, and a carrier therefor.

References Cited in the file of this patent

UNITED STATES PATENTS

| | | |
|---|---|---|
| 2,351,311 | Alder et al. | June 13, 1944 |
| 2,657,168 | Buntin | Oct. 27, 1953 |
| 2,676,132 | Bluestone | Apr. 20, 1954 |